United States Patent
Naske

(10) Patent No.: US 11,729,368 B2
(45) Date of Patent: Aug. 15, 2023

(54) AUTOSTEREOSCOPIC DISPLAY

(71) Applicant: PSHOLIX AG, Basel (CH)

(72) Inventor: Rolf-Dieter Naske, Kakenstorf (DE)

(73) Assignee: PSHOLIX AG, Basel (CH)

( * ) Notice: Subject to any disclaimer, the term of this patent is extended or adjusted under 35 U.S.C. 154(b) by 0 days.

(21) Appl. No.: 17/420,656

(22) PCT Filed: Dec. 23, 2019

(86) PCT No.: PCT/EP2019/086953
§ 371 (c)(1),
(2) Date: Jul. 2, 2021

(87) PCT Pub. No.: WO2020/141133
PCT Pub. Date: Jul. 9, 2020

(65) Prior Publication Data
US 2022/0103804 A1 Mar. 31, 2022

(30) Foreign Application Priority Data
Jan. 3, 2019 (DE) ............... 10 2019 100 066.1

(51) Int. Cl.
H04N 13/317 (2018.01)
H04N 13/305 (2018.01)

(52) U.S. Cl.
CPC ......... *H04N 13/317* (2018.05); *H04N 13/305* (2018.05)

(58) Field of Classification Search
USPC .......................................................... 348/51
See application file for complete search history.

(56) References Cited

U.S. PATENT DOCUMENTS

| | | | | |
|---|---|---|---|---|
| 7,813,042 B2 * | 10/2010 | Mather | ............ | G02B 30/31 348/42 |
| 2010/0033813 A1 * | 2/2010 | Rogoff | ............ | G02B 30/27 348/E13.001 |
| 2013/0286059 A1 * | 10/2013 | Saishu | ............ | H04N 13/317 345/698 |
| 2014/0233100 A1 * | 8/2014 | Sato | ............ | G02B 27/0172 359/463 |
| 2018/0284465 A1 * | 10/2018 | Kwon | ............ | H01L 27/3258 |

FOREIGN PATENT DOCUMENTS

| | | | | |
|---|---|---|---|---|
| EP | 2027728 A1 | 2/2009 | | |
| WO | 2011082992 A2 | 7/2011 | | |
| WO | WO-2019164745 A1 * | 8/2019 | ......... | G02B 27/0075 |

OTHER PUBLICATIONS

J.C. Maxwell, On the cylinder, Quart. J. of Pure & Applied Math. IX, 11-126 (1868).
C. van Berkel, "Image preperation for 3D-LCD", Proc. SPIE 3639, 84-91 (1999).

* cited by examiner

Primary Examiner — Behrooz M Senfi
(74) Attorney, Agent, or Firm — Maschoff Brennan

(57) ABSTRACT

The invention relates to a display design wherein the space between the pixels of a display panel, the black matrix, is not magnified together with other content. The visibility of particularly smaller objects such as e.g. letters is thus increased.

14 Claims, 4 Drawing Sheets

AUTOSTEREOSCOPIC DISPLAY

The autostereoscopic display device presented here, briefly referred to as a display or autostereoscopic display, improves the image quality in such a way that the black spaces between the pixels of the display, also briefly referred to as "black matrix", are not enlarged by the optical lens system. This improves the recognisability of small objects, such as letters, and results in a better image quality, in particular in the 2D mode of the display suitable for 3D representations, which is identical to the image quality of a 2D display without lens system.

DESCRIPTION OF THE STATE OF THE ART AND CONCEPTUAL FORMULATION

In recent years, the picture quality of display devices has improved significantly. The resolution has been improved by factors of 16 and more. The dynamic range of the colours has also been increased and adapted to the colour sensitivity of the eyes, e.g. through HDR or UHD. Experiments have also been made in the area of visualising spatial depth on displays and other display devices. For the displays developed for this purpose, however, the so-called 3D glasses were required. These 3D-glasses then ensured that the right and left eyes were given two different perspectives. A right perspective to the right eye and a left perspective to the left eye. The human brain can then generate the so-called internal stereoscopic image from the two different perspectives, in which different spatial depths are assigned to different objects in the scene. The viewer thus recognises which objects are in the foreground and which objects are in the background. The principle of stereoscopic image on a display through 3D glasses is therefore basically correct and creates the desired effect of spatial depth.

However, viewers are not always willing to put on such 3D glasses. In the field of construction or medicine, for example, these 3D glasses have been accepted. However, in the consumer sector, to view 3D games or 3D videos three-dimensionally at home, this 3D glass viewing process has not been accepted.

Figure 1:
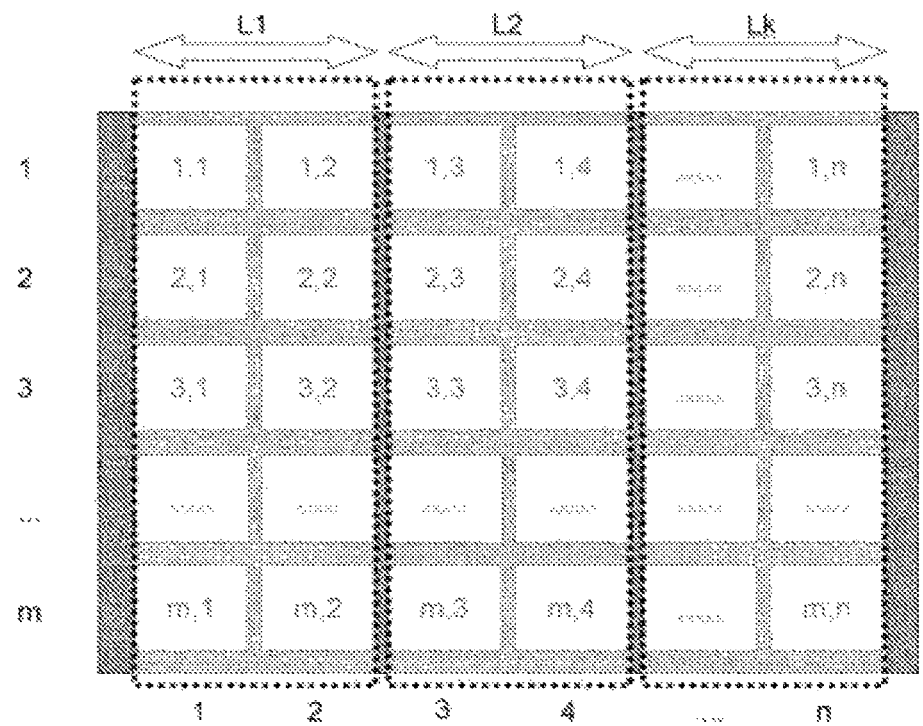

So other processes were developed by which the two different perspectives could be delivered to the two eyes without 3D glasses. This was achieved by placing a lens system in front of the display, e.g. lenticular lenses or elementary lenses. Such a lens system generally consists of a number of lenses covering the display from the top pixel line to the bottom pixel line. FIG. 1 shows this for a lenticular lens system.

In the course of development, two technologies asserted themselves in terms of autostereoscopic displays. One is lenticular lens technology using lenticular lenses and the other is integral imaging technology, referred thereto as elementary lenses.

Since the introduction and use of lenticular lenses for autostereoscopy by J. C. Maxwell (J. C. Maxwell, "On the cylinder", Quart. J. Of Pure & Applied Math. IX, 11-126 (1868)), little has changed there. Thus, a convenient multi-viewer configuration with inclined lenticular lenses was presented by C. van Berkel (C. van Berkel, "Image preparation for 3D-LCD", Proc. SPIE 3639, 84-91 (1999)). For this, C. van Berkel also developed the formulas with which one can calculate which perspective should be displayed on which subpixel.

A further improvement in optical quality has been described by printing black stripes on the back of the lens system by Dahnert (Dahnert, Ulrich, "Device for Three-dimensional Representation of Multiple Views and Method for the Production thereof", WO 2011/082992 A2).

In principle, the use of lenticular lenses in an autostereoscopic display results in so-called visual zones in front of the display, especially if this lens system is not aligned horizontally or vertically to the position of the pixels, but is tilted at a certain angle. If a viewer has both eyes in the same visual zone, he or she has a good 3D impression. If this is not the case, the result is a blurred impression or so-called ghosting.

Therefore, with Dahnert, black stripes are printed between two adjacent lenses on the rear side of the lens system in order to avoid these ghost images. In the following, the flat side of the lens system will always be referred to as the back side of the optical lenticular system. However, the black stripes are not disposed above the black matrix, but rather separate the adjacent lenticular lenses from each other. For Dahnert, this means that for the viewer, when he is on the edge of a visual zone, seeing unwanted perspectives is reduced. The 3D impression becomes clearer for the viewer in the entire area in front of the display.

Figure 6:
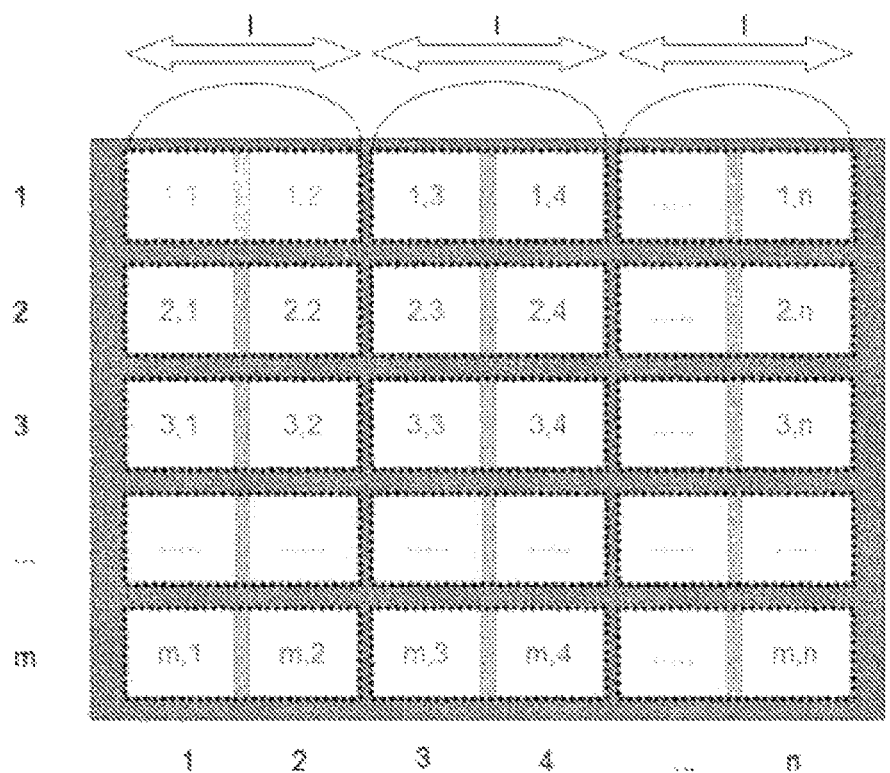

Another autostereoscopy methodology, besides lenticular lens technology, is integral imaging technology. Integral imaging displays use an optical system consisting of a number of "hemispheres", called elementary lenses, mounted equally on the display panel (FIG. 6). This elementary lens system also has a pixel enlarging effect in horizontal and vertical direction. From each position in front of the display, a certain number of pixels can be seen, which are then enlarged and thus produce a stereoscopic overall image for the left and right eye from every position. The special feature of this technology is, however, that one can not only move to the right and left to look behind the objects in the foreground ("walk-around effect"), but that one can also move up or down to look behind the objects in the foreground from above or below. So it has an additional degree of freedom compared to lenticular lens technology. The disadvantage, however, is that the visible resolution decreases not only in the horizontal direction as with the lenticular lenses, but also in the vertical direction. Integral imaging displays with a reasonable number of elementary lenses resulted in a smaller number of pixels for HD displays in any viewing position than for a VGA display. In addition, it is necessary that the capturing camera also uses the same elementary lens system as the display to capture meaningful images for this display. Since such cameras are not yet commercially available, there is very little image content that is suitable for integral imaging displays.

On the other hand, technology has improved significantly both in the area of lens production and in the area of display technology. On the one hand, it is possible to manufacture much smaller lens systems. On the other hand, the colour quality of the displays has improved considerably and, for example, the resolution has increased significantly.

The image points of a display will be referred to hereafter as pixels. The pixel structure used hereafter refers to the surface of the display on which the pixels are physically located and is referred to hereafter as the display panel. The areas responsible for the basic colours of a pixel, called subpixels, are disposed adjacent to each other. Typically, the pixel structure is disposed in the form of a plurality of pixel rows and pixel columns. The black matrix is located between such adjacent pixel rows and pixel columns. The pixel rows and pixel columns do not necessarily have to be a straight line or strictly horizontally or vertically aligned.

The display shown in FIG. 1 according to the state of the art has n pixels per line and a total of m pixel lines. The lens systems used differ, for example, in that the optimal viewing distance is different, or that the lens width covers different numbers of pixels, or whether it has been optimised for one viewer ("single viewer") or for several viewers at the same time ("multiple viewer"), or whether the lenses are facing towards or away from the display, or whether the lenses run parallel to the pixel columns or are disposed obliquely (FIG. 2), etc. For each individual viewer, the viewing angle of the two eyes is different due to the different viewing positions of the left and right eyes. As a result, the left and right eyes see different pixels on the display. If you make sure that the pixels that the left eye sees belong to the left perspective and the pixels that the right eye sees belong to the right perspective, then both eyes see different perspectives and the brain can generate the internal stereoscopic image. The magnifying effect of the lens system ensures that each eye sees a complete image covering the entire display, i.e. a complete perspective. The viewer sees 3D. This technology is called autostereoscopy because the viewer does not need any visual aid.

Unfortunately, however, the pixels of a display are neither horizontally nor vertically disposed in a bundle. There are spaces of different sizes in the horizontal and vertical directions. This is due to the construction and manufacturing technology of the displays. Let the gap width in the horizontal direction be h>0. In the vertical direction, the width of the gap is denoted by v>0. If a lens system is now placed in front of this display, the area of the spaces is also enlarged by the lenses. Since these spaces generally contain no light, they are black and are therefore also called "black matrix". However, the enlargement of the spaces leads to small objects in particular being distorted by these enlarged spaces. For example, the "black matrix" mentioned above, i.e. the space between the pixels on the display panel, has an average width of h>0 in the horizontal direction and an average width of v>0 in the vertical direction.

This effect is particularly disadvantageous for letters where the lines are especially thin. The reduction in the size of the spaces, the "black matrix", means that the lines are no longer straight and the readability of the text is reduced as a result.

The objective of the autostereoscopic display presented here is therefore to describe an optical system by which the spaces between the pixels of the display device are no longer enlarged and thus the image quality is improved even when displaying very small objects.

SUMMARY OF THE INVENTION

It is an object of the invention to provide a type of display in which the space between the pixels of the display panel, the so-called "black matrix", is at least partially not enlarged. This increases the perceptibility, in particular of smaller objects, such as letters.

The autostereoscopic display used to improve the autostereoscopic viewing quality comprising a display panel which features a plurality of pixels separated from each other by spaces, the pixels representing the content of a stereoscopic image with 2 or more perspectives to be displayed, and an optical lens system in two configurations which is disposed in front of the display panel in the direction of the viewer, wherein a) the lens system a) the display-panel covering a plane side and on the other side comprising a plurality of lenticular lenses arranged side by side with convexly curved lens surfaces in the horizontal direction on the outer lens surface, wherein the outer lens surface has a plurality of strip-shaped recesses in the lens surface, which are respectively disposed such that the recesses at least partially move in parallel the horizontal spaces, cover the vertical spaces or the vertical and horizontal spaces between the pixels with respect to a position of the viewer in front of the display; or b) the lens system b) comprises a plurality of pillow-shaped lenses arranged side by side in a layer, which are convexly curved in the horizontal direction, and the lenses each cover at least a number of horizontally adjacent pixels, in particular 1 to 16, and the horizontal spaces between the pixel lines are recessed by the pillow-shaped lenses.

The autostereoscopic display for improving the autostereoscopic viewing quality is described in claim 1. Preferred embodiments are the subject of the subclaims or described below.

In the embodiment a) of the invention, the lenticular lenses of the optical system are interrupted exactly where the horizontal spaces are located on the display panel. This prevents the magnifying effect at exactly these positions.

In particular, at least about 50%, preferably at least about 80%, of the horizontal lines of the Black Matrix are recessed above or on the edge of the lens by means of recesses. This can be in the form of grooves above the horizontal Black Matrix.

According to embodiment b) of the invention, a plurality of pillow-shaped lenses, each of which is located over only one pixel or over a few neighbouring pixels, e.g. over 2 to 32, in particular 2 to 16, form a layer in front of the display panel: e.g. 1 or 2 pixels in the vertical direction and 1 to 16 or 2 to 8 pixels in the horizontal direction.

The horizontal spaces (black matrix) are not covered by the lens system or, in other words, are recessed with respect to an overlying curved lens surface. According to one embodiment, this lens system has no pixel magnifying effect in the vertical direction and is therefore compatible with the image content captured by stereo cameras with 2 or more lenses, since their 2 or more lenses are always disposed horizontally and therefore cannot produce a vertical "walk-around effect", i.e. one cannot look from above or below behind objects that are in the foreground. The pillow-shaped lenses feature convex curved surfaces (spread lenses) in the horizontal spatial direction, possibly additionally but not necessarily also in the vertical spatial direction. On the contrary, the lens surfaces are preferably not curved in the vertical direction.

Figure 10:
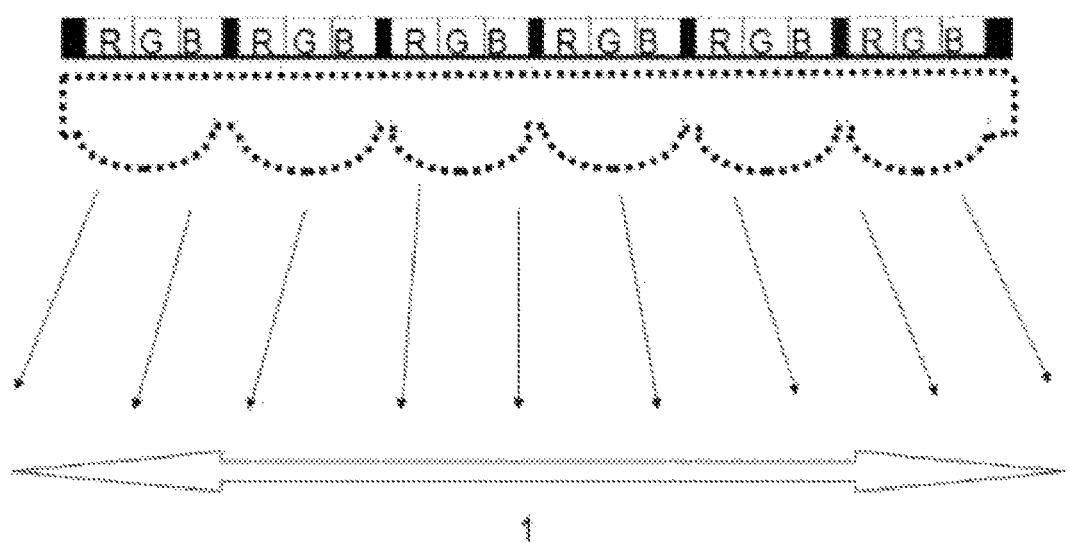

The pillow-shaped lenses can be disposed in such a way that they end there (lowest point of the curved lens surface) in relation to the horizontal lines of the black matrix. The pillow-shaped lenses do not have to be arranged in a row (FIG. 8+9), but can also be disposed in rows opposite each other (FIG. 10).

DETAILED DESCRIPTION OF THE INVENTION

The state of the art (FIGS. 1, 2 and 5) and the invention (FIGS. 3, 4 and 6-10)) are explained with reference to the following figures, without the invention being limited to the embodiments shown.

FIG. 1: Plan view of the display with vertical lenticular lenses.

| | |
|---|---|
| 1, . . . m | Pixel rows |
| 1, . . . , n | Pixel columns |
| 1, 1, . . . , m, n | Pixels of the display |
| L1, . . . , Lk | Numbers of the lenticular lenses |
| Dashed lines | Lenticular lenses |
| Grey lines | Black matrix |

Figure 2:
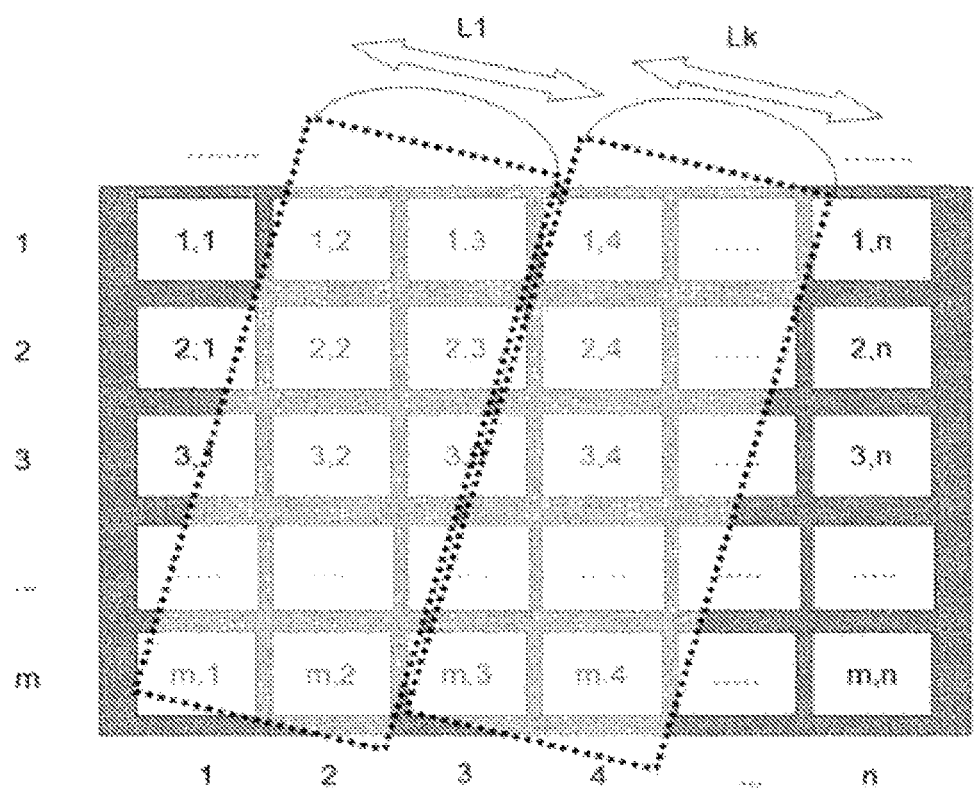

FIG. 2: Top view of the display with diagonally positioned lenticular lenses.

| | |
|---|---|
| 1, ..., m | Pixel lines |
| 1, ..., n | Pixel columns |
| 1, 1, ..., m, n | Pixels of the display |
| L1, ..., Lk | Numbers of the lenticular lenses |
| Dashed lines | Lenticular lenses |

Figure 3:
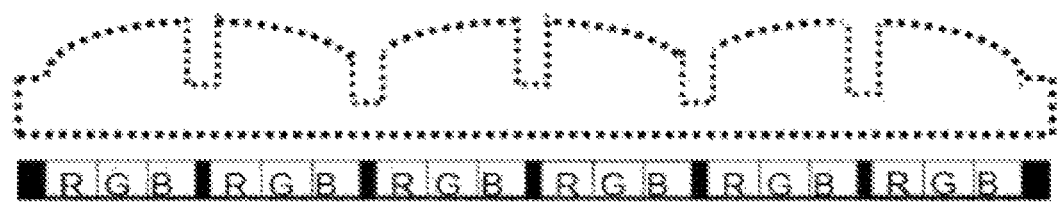
Figure 4:
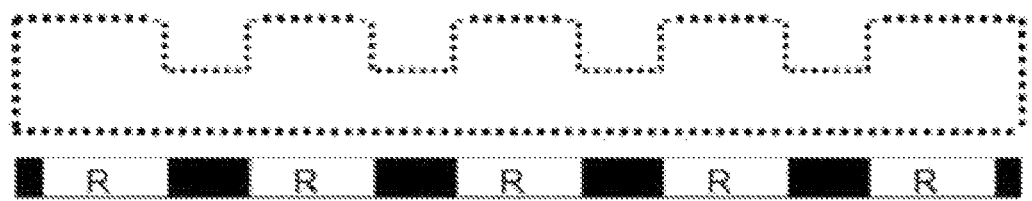

FIGS. 3 and 4: Cross-section of the display with vertical lenticular lenses and lenticular lenses interrupted at the pixel rows by the strip-shaped recesses.

FIG. 3: Horizontal cross-section with convex curved surfaces.

| | |
|---|---|
| RGB | Subpixel of a pixel with the colours red, green and blue (example) |
| Dashed lines | Lenticular lenses |

FIG. 4: Vertical cross-section with essentially flat surface without magnifying effect of pixels

| | |
|---|---|
| R | Red subpixels of a pixel (example) |
| Dashed lines | Lenticular lenses |

Figure 5:
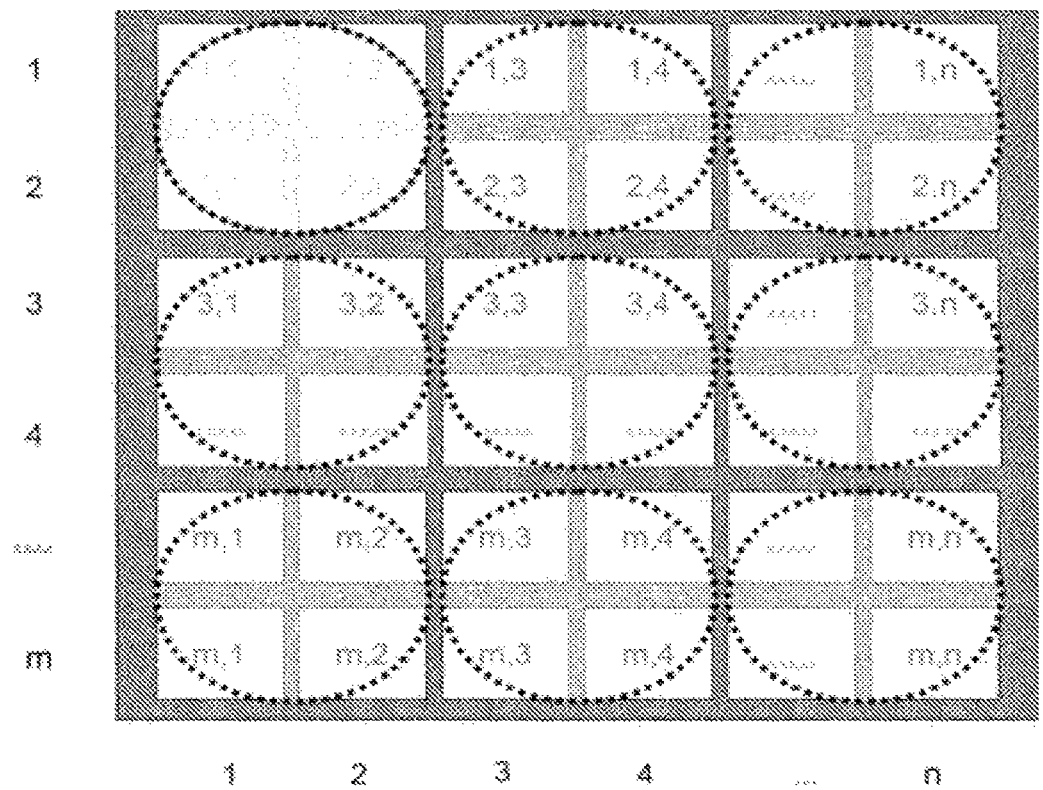

FIG. 5: Top view of an integral imaging display with a plurality of hemispheres as lenses, also called elementary lenses.

| | |
|---|---|
| 1, ... m | Pixel lines |
| 1, ..., n | Pixel columns |
| 1, 1, ..., m, n | Pixels of the display |
| Dashed lines | Elementary lenses |

FIG. 6: Top view of an autostereoscopic display with optical elements similar to integral imaging, disposed in columns. Each lens extends over e.g. 2 pixel columns (example).

| | |
|---|---|
| 1, ... m | Pixel rows |
| 1, ..., n | Pixel columns |
| 1, 1, ..., m, n | Pixels of the display |
| Dashed lines | Integral imaging cushion-shaped lenses |

Figure 7:
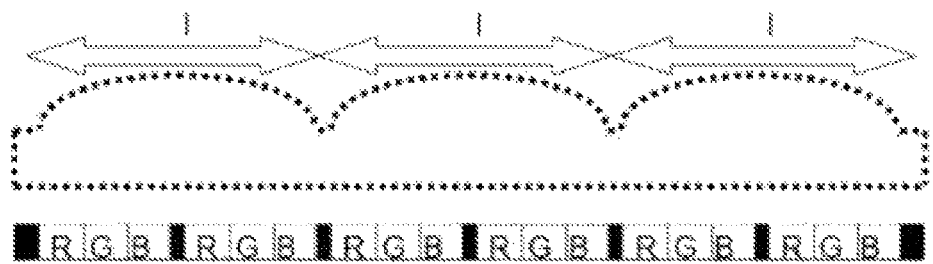
Figure 8:
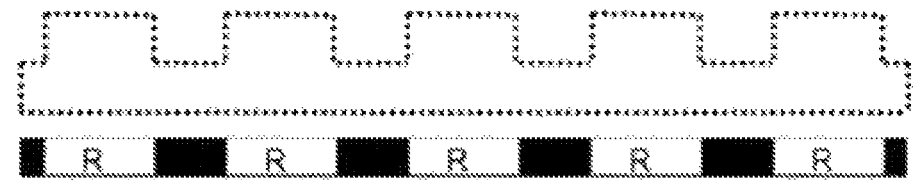

FIGS. 7 and 8: Cross-section of an autostereoscopic display with optical elements similar to integral imaging, disposed in columns (horizontal and vertical). Each lens extends over e.g. 2 pixel columns (example) and features recesses above the horizontal black matrix lines in such a way that the cushion-shaped lenses do not continue there or are interrupted.

FIG. 7: Horizontal cross-section with convex curved surfaces

| | |
|---|---|
| RGB | Subpixel of a pixel with the colours red, green and blue (example) |
| Dashed lines | Integral imaging-like cushion-shaped lenses |

FIG. 8: Vertical cross-section with flat surface, i.e. without pixel magnifying effect.

| | |
|---|---|
| R | Red subpixels of a pixel (exemplary) |
| Dashed lines | Integral imaging-like cushion-shaped lenses |

Figure 9:
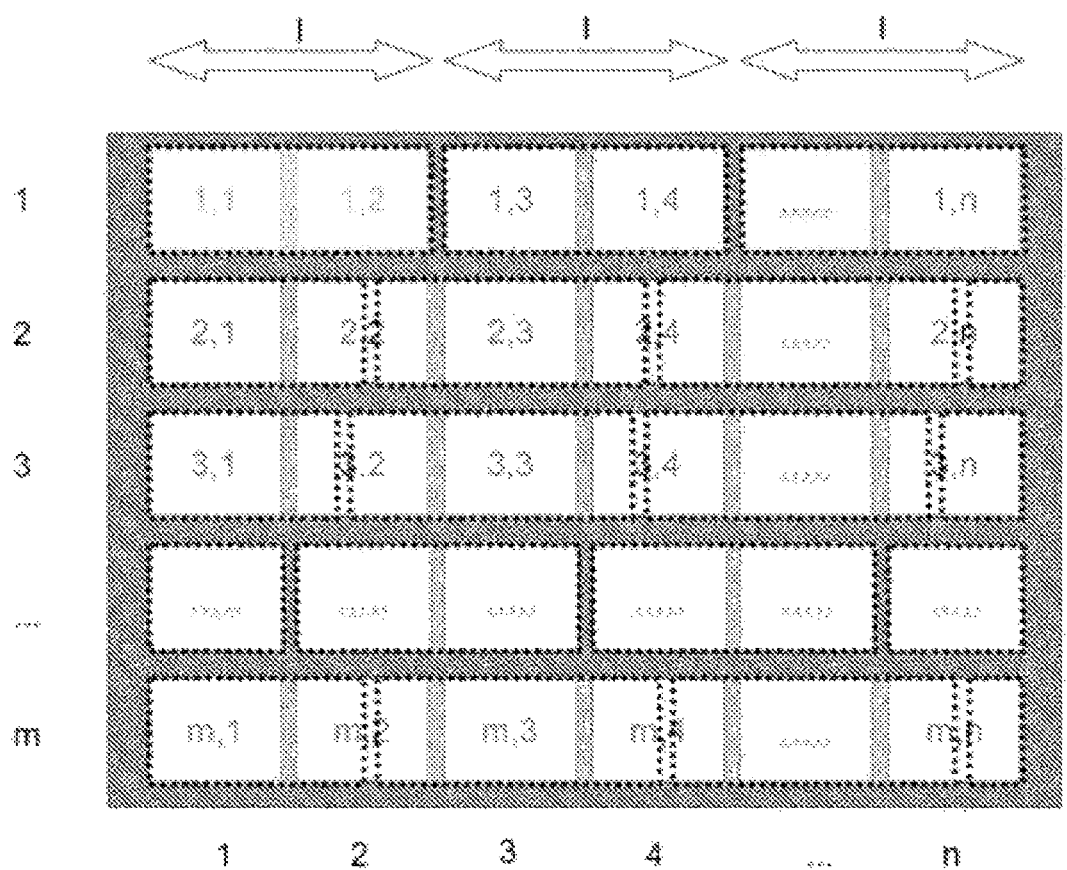

FIG. 9: Top view of an autostereoscopic display with optical elements similar to integral imaging, which are displaced against each other line by line. Each lens extends over e.g. 2 pixel columns (exemplary).

| | |
|---|---|
| 1, ... m | Pixel rows |
| 1, ..., n | Pixel columns |
| 1, 1, ..., m, n | Pixels of the display |
| Dashed lines | Integral imaging cushion-shaped lenses |

FIG. 10: Cross-section of an autostereoscopic display with optical elements similar to integral imaging (horizontal). The arrows show the display direction of 9 different perspectives of a visual zone. Each lens extends over e.g. 2 pixel columns (example).

RGB Subpixel of a pixel with the colours red, green and blue (example)

In embodiment a) of the invention, the lenticular lenses of the optical system are interrupted exactly where the horizontal spaces are located on the display panel. In this way, the magnifying effect is prevented at precisely these positions. This interruption of the lens structure can be done in the same way as the production of the lens structure itself. Laser exposure, for example, heats the material at the lines or areas to be interrupted, causing it to liquefy so that it can then be washed out. The process is as precise as the manufacture of the lenses. The resulting optical lens system is exemplified in FIGS. 3 and 4. It shows a cross-section of the pixel lines of the display panel.

The line width is preferably also chosen in such a way that the interruption results in an optimal viewing quality for the viewer. This can also result in the interruptions being slightly smaller than the respective horizontal and vertical width of the black spaces.

In particular, lenticular lenses do not feature a pixel magnifying effect in the vertical direction and/or the lens surface is substantially flat in the vertical direction.

Preferably, the width h of the strip-shaped recesses is 20% to 120% of the distance of the adjacent pixel lines located thereunder, in each case measured from pixel edge to pixel edge in the horizontal direction, preferably 80 to 105%.

Preferably, the width v of the strip-shaped recesses is 20% to 120% of the distance of the pixel lines located thereunder, in each case measured from pixel edge to pixel edge in the vertical direction, preferably 80 to 105%.

The strip-shaped recesses may have the shape of grooves, preferably in the section of U-shaped grooves with a round and/or angular profile.

In a second embodiment (embodiment b)), no lenticular-based lens system is used. It is an optical lens system based on integral imaging technology (FIG. 5).

Preferably, the cushion-shaped lenses do not feature any pixel-magnifying effect in the vertical direction and/or the lens surface is essentially flat in the vertical direction. In particular, the individual cushion-shaped lenses cover the pixel lines and have a pixel-magnifying effect only in the horizontal direction where the pixels are located on the display panel.

According to one embodiment, the vertical lens ends of the cushion-shaped lenses are vertically aligned with the pixel ends on the display panel, in particular every or every other pixel end.

The vertical lens ends of the cushion-shaped lenses may be shifted against each other by one or more pixel columns, in particular up to 4 pixel columns from one horizontal pixel row to the next horizontal pixel row.

The cushion-shaped lenses with l=1 can each overlay only one pixel and the diffraction angles of the adjacent lenses are then different and matched to each other in such a way that the viewing positions of the adjacent lenses are adjacent.

In particular, the optical lens system b) features a plane side towards the display panel and the plurality of pillow-shaped lenses arranged next to each other on the other outer side.

Where the horizontal and/or vertical spaces between the pixel lines are not recessed by the cushion-shaped lenses, the cushion-shaped lenses may additionally have strip-shaped recesses in the outer lens surface, which are each so disposed that the recesses at least partially cover the horizontal spaces, the vertical spaces or the vertical and horizontal spaces between the pixels, each displaced in parallel with respect to a position of the viewer in front of the display.

In the embodiment described in FIG. 10, each individual lens l>=1 horizontally adjacent pixels. The magnifying lens covers a large number of these adjacent pixels and is suitable for displaying images and videos taken by a stereo camera with only 2 or more lenses.

For this reason, image and video content that has been recorded for decades exists and can be displayed well. This is not the case with classic integral imaging displays.

The multitude of cushion-shaped lenses of this optical lens system horizontally overlays only the pixels of the display and not the horizontal spaces of the pixel lines. FIG. 6 shows a top view of such a display.

The black spaces between the pixel lines are not enlarged. This significantly increases the readability and visibility of small object structures. A horizontal pixel-magnifying lens structure results horizontally in the same "walk-around effect" as in an autostereoscopy with lenticular lenses. However, according to a preferred embodiment, a vertical look behind the objects in the foreground does not result because it was not picked up by the horizontal position of the lenses of the stereo camera, and the lenses therefore do not need a pixel magnifying effect in the vertical direction. The additional vertical degree of freedom was eliminated in favour of compatibility with conventional stereo cameras.

If the individual lenses of this optical lens system, which is similar to integral imaging as described here, are shifted line by line in relation to each other (FIG. 9), similar to a lenticular lens structure with slanted lenses, the result is that one or more viewers have a good spatial viewing effect from many positions in front of the display at the same time. In contrast to a slanted lenticular lens system, the edges of each lens are however aligned horizontally and vertically. Horizontally, this results in the black horizontal spaces between the pixel lines being well eliminated in their visibility.

Vertically, this results in the lenses always completely covering a pixel from the upper edge of the pixel to the lower edge of the pixel.

This is not the case with inclined lenticular lenses and leads to the so-called moiré effect, which has to be compensated for at great expense. With the optical lens system presented here, which is similar to integral imaging, this is not necessary.

In the previous illustration it was always described that each lens l covers horizontally adjacent pixels of the display. Based on a lenticular lens system, this could be e.g. 3 or 4 pixels or 9 or 12 RGB subpixels. However, this is not necessarily required. It is also possible to choose l=1 if the lenses are constructed in such a way that they each cover only exactly 3 RGB subpixels in the case of an RGB display or, for example, 4 subpixels in the case of an RGBW or RGBY-display.

In this case, however, it is important to ensure that the diffraction angles of adjacent lenses are matched and that adjacent lenses result in the viewing positions of adjacent lenses also being adjacent, so that there are visual zones in front of the display. This is shown schematically in FIG. 10 with 9 perspectives.

This structure also eliminates the visibility of the vertical column spaces between the pixels.

Furthermore, it should be noted that the optical lens system presented here is compatible with all display technologies such as OLED, LCD, quantum dot, etc. It can be used with all resolutions and display sizes. Of course, the lens size and structure must always be adapted to the display.

The effect of magnifying the black spaces between the pixels is also known in the field of projection technology. The black spaces are also magnified by the projectors. There, this effect is called the "screen door" effect.

Since the spaces between the pixels are not always uniformly linear, but can also be structured differently due to an octagonal or other structure of the pixels and subpixels, such as in pentile displays, the value c in this patent application is of particular importance. It ensures that the lenses or black stripes of the optical element create a balancing effect.

In contrast to autostereoscopic displays, which are based on slanted lenticular lenses, the embodiment described here has vertical lens ends that coincide with the pixel ends on the display panel and are not slanted.

This is a further contribution to improving the image quality and readability of e.g. letters.

Special attention must be paid to the precise positioning of the new, improved lens system. The strip-shaped recesses must be located as precisely as possible above the spaces of the used pixel structure.

The precise mechanical positioning directly above this display panel is a standard technology in display manufacturing and is already used for the precise positioning of the electronic structures.

Furthermore, the super multiview technology described in I.-H. Naske et al., "Process and device for pseudo-holographic image synthesis", EP 2027728 A1 can be realised without any problems.

In conclusion, it can be said that there is an optical lens system described here that can be positioned between lenticular lens technology and integral imaging technology.

The invention claimed is:

1. An autostereoscopic display for improving autostereoscopic viewing quality comprising:
   a display panel which features a plurality of pixels separated by spaces, wherein the pixels represent content of a stereoscopic image with two or more perspectives to be displayed, and
   an optical lens system in one of two configurations which is disposed in front of the display panel in a direction of a viewer, wherein:
      in a first configuration of the lens system, the display panel covers a plane side and on the other side includes a plurality of lenticular lenses arranged side by side with convexly curved lens surfaces in a horizontal direction on an outer lens surface, wherein the outer lens surface has a plurality of strip-shaped recesses in the lens surface, which are respectively disposed such that the recesses at least partially move in parallel horizontal spaces, cover vertical spaces or the vertical and horizontal spaces between the pixels with respect to a position of the viewer in front of the display; or in a second configuration of the lens system, the lens system includes a plurality of pillow-shaped lenses arranged side by side in a layer, which are convexly curved in the horizontal direction, and the lenses each cover at least a number of horizontally adjacent pixels, in particular 1 to 16, and the horizontal spaces between the pixel lines are recessed by the pillow-shaped lenses; and wherein a width h of the strip-shaped recesses corresponds to 20% to 120% of the distance of the adjacent pixel lines located thereunder, in each case measured from pixel edge to pixel edge in the horizontal direction.

2. The autostereoscopic display according to claim 1, wherein a width v of the strip-shaped recesses corresponds to 20% to 120% of the distance of the pixel lines located thereunder, in each case measured from pixel edge to pixel edge in the vertical direction.

3. The autostereoscopic display according to claim 1, wherein the vertical lens ends of the cushion-shaped lenses are shifted against each other in one or more pixel columns, from one horizontal pixel row to the next horizontal pixel row.

4. The autostereoscopic display according to claim 1, wherein—where the horizontal and/or vertical spaces between the pixel lines are not recessed by the cushion-shaped lenses— in the cushion-shaped lenses there are additionally strip-shaped recesses in the outer lens surface, which are respectively disposed in such a way that the recesses, in each case parallelly displaced, cover at least partially the horizontal spaces, vertical spaces or the vertical and horizontal spaces between the pixels, with respect to a position of the viewer in front of the display.

5. The autostereoscopic display according to claim 1, wherein the lenticular lenses do not feature a pixel-magnifying effect in the vertical direction and the lens surface is substantially flat in the vertical direction; and wherein the width h of the strip-shaped recesses corresponds to 20% to 120% of the distance of the adjacent pixel lines located thereunder, in each case measured from pixel edge to pixel edge in the horizontal direction.

6. The autostereoscopic display according to claim 1, wherein the lenticular lenses do not feature a pixel-magnifying effect in the vertical direction and the lens surface is substantially flat in the vertical direction; and wherein the width v of the strip-shaped recesses corresponds to 20% to 120% of the distance of the pixel lines located thereunder, in each case measured from pixel edge to pixel edge in the vertical direction.

7. The autostereoscopic display according to claim 1, wherein the cushion-shaped lenses do not feature a pixel-magnifying effect in the vertical direction and the lens surface is essentially flat in the vertical direction;

wherein the vertical lens ends of the cushion-shaped lenses are shifted against each other in one or more pixel columns from one horizontal pixel row to the next horizontal pixel row.

8. The autostereoscopic display device according to claim 1, wherein the cushion-shaped lenses do not feature a pixel-magnifying effect in the vertical direction and in particular the lens surface is essentially flat in the vertical direction;

wherein the optical lens system b) features a flat side towards the display panel and the other outer side features the plurality of pillow-shaped lenses arranged side by side.

9. The autostereoscopic display device according to claim 1, wherein the width h corresponds to 80% to 105% of the distance of the adjacent pixel lines located thereunder.

10. The autostereoscopic display device according to claim 2, wherein the width v of the strip-shaped recesses corresponds to 80% to 105% of the distance of the pixel lines located thereunder.

11. The autostereoscopic display device according to claim 3, wherein the vertical lens ends of the cushion-shaped lenses are shifted against each other in up to 4 pixel columns.

12. The autostereoscopic display device according to claim 5, wherein the width h corresponds to 80% to 105% of the distance of the adjacent pixel lines located thereunder.

13. The autostereoscopic display device according to claim 6, wherein the width v of the strip-shaped recesses corresponds to 80% to 105% of the distance of the pixel lines located thereunder.

14. The autostereoscopic display device according to claim 7, wherein the vertical lens ends of the cushion-shaped lenses are shifted against each other in up to 4 pixel columns.

* * * * *